(12) United States Patent
Chen et al.

(10) Patent No.: US 8,171,134 B2
(45) Date of Patent: May 1, 2012

(54) METHODS AND APPARATUS TO CHARACTERIZE AND PREDICT NETWORK HEALTH STATUS

(75) Inventors: Min-Hsuan Chen, Colts Neck, NJ (US); Li-Jin Chung, Lincroft, NJ (US); Chee Ching, Holmdel, NJ (US); David H. Lu, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 265 days.

(21) Appl. No.: 12/406,296

(22) Filed: Mar. 18, 2009

(65) Prior Publication Data

US 2010/0238814 A1 Sep. 23, 2010

(51) Int. Cl.
G06F 15/173 (2006.01)

(52) U.S. Cl. ........ 709/224; 709/223; 709/225; 709/241; 706/21; 706/46; 706/47; 706/56

(58) Field of Classification Search .................. 709/223, 709/224, 225, 241
See application file for complete search history.

(56) References Cited

U.S. PATENT DOCUMENTS

| | | | | |
|---|---|---|---|---|
| 5,390,326 | A * | 2/1995 | Shah | 370/222 |
| 5,790,431 | A * | 8/1998 | Ahrens et al. | 718/104 |
| 5,819,028 | A * | 10/1998 | Manghirmalani et al. | 714/57 |
| 5,896,503 | A * | 4/1999 | Badovinatz et al. | 709/201 |
| 5,909,540 | A * | 6/1999 | Carter et al. | 714/4.4 |
| 5,926,619 | A * | 7/1999 | Badovinatz et al. | 714/4.1 |
| 6,336,191 | B1 * | 1/2002 | Smolders et al. | 713/501 |
| 6,424,930 | B1 * | 7/2002 | Wood | 702/184 |
| 6,427,114 | B1 | 7/2002 | Olsson | |
| 6,442,694 | B1 * | 8/2002 | Bergman et al. | 726/22 |
| 6,681,232 | B1 * | 1/2004 | Sistanizadeh et al. | 1/1 |
| 6,754,473 | B1 * | 6/2004 | Choi et al. | 455/101 |
| 6,833,787 | B1 * | 12/2004 | Levi | 340/539.13 |
| 6,850,524 | B1 | 2/2005 | Troxel | |
| 6,901,347 | B1 * | 5/2005 | Murray et al. | 702/182 |
| 7,075,894 | B2 * | 7/2006 | Hein et al. | 370/244 |
| 7,246,229 | B2 * | 7/2007 | Suermondt et al. | 713/100 |
| 7,251,690 | B2 * | 7/2007 | Williams | 709/224 |
| 7,254,750 | B1 * | 8/2007 | Okun et al. | 714/47.2 |
| 7,324,535 | B1 * | 1/2008 | Goss et al. | 370/411 |
| 7,412,241 | B2 * | 8/2008 | Strutt | 455/445 |
| 7,415,391 | B2 * | 8/2008 | Chen et al. | 702/189 |
| 7,506,215 | B1 * | 3/2009 | Maw et al. | 714/47.2 |
| 7,733,784 | B2 * | 6/2010 | Nam et al. | 370/238 |
| 7,734,574 | B2 * | 6/2010 | Dang et al. | 1/1 |
| 7,765,294 | B2 * | 7/2010 | Edwards et al. | 709/224 |
| 7,797,421 | B1 * | 9/2010 | Scofield et al. | 709/224 |
| 7,870,243 | B1 * | 1/2011 | Aikens et al. | 709/224 |
| 8,040,811 | B2 * | 10/2011 | Edwards et al. | 370/241 |
| 2003/0061340 | A1 * | 3/2003 | Sun et al. | 709/224 |

(Continued)

*Primary Examiner* — Backhean Tiv
(74) *Attorney, Agent, or Firm* — Toler Law Group, PC (57) ABSTRACT

Methods and apparatus to characterize and predict network health status are presented. A particular method of characterizing and predicting a health status of a network node includes receiving a plurality of report values associated with the network node, where each report value is one of alert and normal, and where each report value is received at a corresponding time. The method includes calculating a current report weight associated with a current report value received at a current time. When a first previous report value was received at a first previous time before the current time, the current report weight is calculated based at least partially on the current report value and at least partially on a first previous report weight associated with the first previous value. The method includes storing the current report weight at a memory device.

8 Claims, 8 Drawing Sheets

U.S. PATENT DOCUMENTS

| | | | |
|---|---|---|---|
| 2005/0262563 A1* | 11/2005 | Mahone et al. | 726/22 |
| 2007/0150581 A1* | 6/2007 | Banerjee et al. | 709/224 |
| 2008/0134046 A1* | 6/2008 | Gray et al. | 715/736 |
| 2008/0168018 A1* | 7/2008 | Rohlfing | 706/47 |
| 2009/0112809 A1* | 4/2009 | Wolff et al. | 707/3 |
| 2009/0113034 A1* | 4/2009 | Krishnappa et al. | 709/223 |
| 2009/0138239 A1* | 5/2009 | Golani et al. | 702/186 |
| 2009/0292695 A1* | 11/2009 | Bayliss | 707/5 |
| 2010/0040616 A1* | 2/2010 | Leung et al. | 424/133.1 |
| 2010/0153344 A1* | 6/2010 | Chen et al. | 707/689 |
| 2010/0175024 A1* | 7/2010 | Schumacher et al. | 715/810 |
| 2010/0238814 A1* | 9/2010 | Chen et al. | 370/252 |

* cited by examiner

METHODS AND APPARATUS TO CHARACTERIZE AND PREDICT NETWORK HEALTH STATUS

FIELD OF THE DISCLOSURE

The present disclosure is generally related to characterizing and predicting network health status.

BACKGROUND

Data networks typically include one or more network nodes that can serve as communication routers. Network performance may be characterized by tracking one or more performance indicators of the network nodes included in the network. For example, health status of a network node may be evaluated by issuing a periodic "heartbeat" signal originating within the network and subsequently monitoring whether or not the heartbeat signal has been received at the network node. Receipt of the heartbeat signal can be indicative that data packets can be transmitted and received at the network node. Evaluating one or more quantities derived from performance indicators may be useful in monitoring network performance.

DETAILED DESCRIPTION

In a particular embodiment, a method of characterizing and predicting a health status of a network node is presented. The method includes receiving a plurality of report values associated with the network node, where each report value is one of alert and normal, and where each report value is received at a corresponding time. The method also includes calculating a current report weight associated with a current report value received at a current time. When a first previous report value was received at a first previous time before the current time, the current report weight is calculated based at least partially on the current report value and at least partially on a first previous report weight associated with the first previous value. The method also includes storing the current report weight at a memory device.

In another particular embodiment, a computer-readable storage medium includes processor-executable instructions that when executed, cause a processor to calculate a current report weight associated with a network node. The current report weight is based at least partially on a current report value associated with the network node and at least partially on a first previous report value associated with the network node. The computer-readable storage medium includes processor-executable instructions that when executed, cause the processor to store the current report weight in a memory.

In another particular embodiment, a system is disclosed and includes a processor to receive a plurality of report values associated with a network node, each report value to be received at a corresponding time within a predetermined time period. The report values include a previous report value received at a previous time and a current report value received at a current time. Each report value is one of alert and normal. The system also includes a memory device accessible to the processor. The memory device includes a calculation module executable by the processor to calculate a current report weight associated with the current report value. The current report weight is based at least partially on the previous report value and based at least partially on the current report value. The system also includes an output module executable by the processor to store the current report weight.

Figure 1:
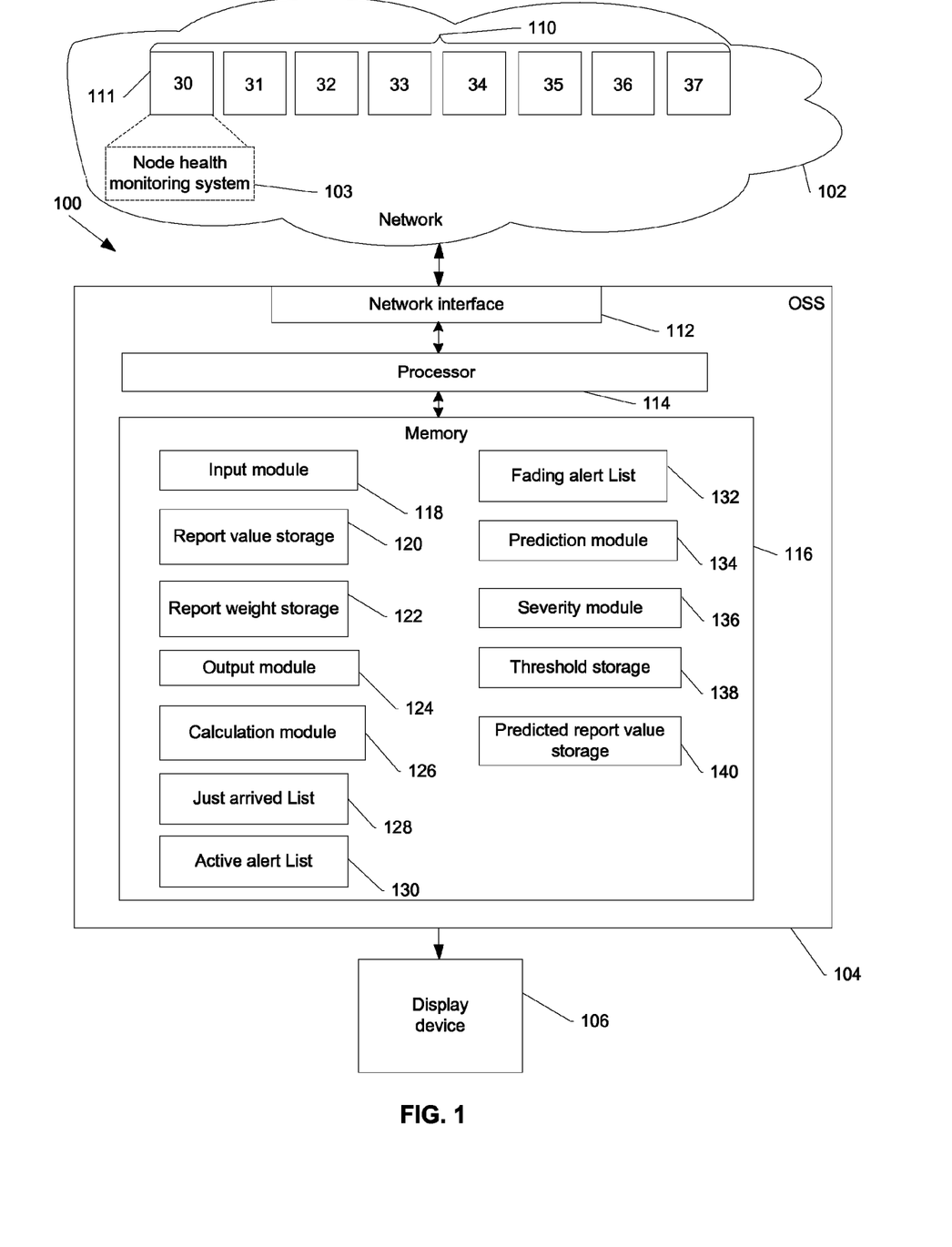
FIG. 1 is a block diagram of a first embodiment of a system to monitor network health status.

FIG. 1 is a block diagram of a first embodiment of a system to monitor network health status. The system 100 includes a network 102, a processing subsystem (that may be referred to as an "Operations Support System" (OSS)) 104, and a display device 106.

The network 102 includes a set of network nodes 110. In a particular embodiment, the network nodes 110 are communication routers that enable an end user device, such as a computing device, to send and receive data packets via the network 102. Each of the network nodes 110 may be assigned a corresponding node number. In a particular embodiment, each network node (also node herein) includes a corresponding node health monitoring system to monitor a health status of the corresponding node. For example, a node 111 includes a node health monitoring system 103 to monitor the health status of the node 111.

At a particular time, one or more of the network nodes 110 may have a corresponding current report value, which can be either normal or alert, reflecting the current health status of the corresponding network node, such as the first node 111. In a particular illustrative embodiment, the corresponding current report value associated with one of the network nodes 110 is determined by the corresponding node health monitoring system in response to receipt or non-receipt of a response to a "heartbeat" signal received from a heartbeat signal source within the network. For example, receipt of the heartbeat signal at the first node 111 may result in a corresponding current report value of normal at the node health monitoring system 103, and the current report value is communicated to the processing subsystem 104. Non-receipt of the heartbeat signal at the first node 111 may result in a corresponding current report value of alert at the node health monitoring system 103, and the current report value is communicated to the processing subsystem 104. A current report value of normal associated with the first node 111 can indicate that communication between the first node 111 and other portions of the network (including other nodes) is normal, i.e., operative. A current report value of alert associated with the first node 111 can indicate a communication failure associated with the first node 111. Each report value associated with each of the network nodes 110 may be communicated from the network 102 to the processing subsystem 104 via a network interface 112. In a particular illustrative embodiment, the heartbeat signal can be generated and sent periodically to one or more nodes of the network 102, such as the network nodes 110.

In other embodiments, report values may be generated based on other criteria. For example, a current report value of alert associated with the first node 111 may be communicated to the network interface 112 of the processing subsystem 104 in response to a high CPU utilization associated with the first node 111. In yet another particular illustrative embodiment, a current report value of alert may be communicated to the network interface 112 in response to a missing route caused by a routing provisioning error. In another illustrative embodiment, the node health monitoring system 103 may send health status report values of the network nodes 110 to the processing subsystem 104 using Simple Network Management Protocol (SNMP) or Command Line Interface (CLI).

The processing subsystem 104 can provide one or more quantitative measures calculated based on the report values received that are associated with a particular one of the network nodes 110. The quantitative measures associated with one of the network nodes 110, such as the first node 111, may serve as indicators of reliability of the first node 111 and may also serve to predict future functional reliability of the first node 111.

The processing subsystem 104 includes the network interface 112, a processor 114, and a memory 116. The network interface 112 is coupled to the processor 114 and is adapted to receive data from the set of network nodes 110. The processor 114 is also coupled to the memory 116.

The memory 116 includes an input module 118, an output module 124, a calculation module 126, a prediction module 134, and a severity module 136. Each of the modules 118, 124, 126, 134, and 136 may be executed by the processor 114.

The input module 118 may be executable by the processor 114 to cause the processing subsystem 104 to input a current report value associated with a corresponding node of the network nodes 110. The processor 114 may store the current report value in a report value storage 120. In a particular illustrative embodiment, when a current report value of alert associated with a particular node is received, the processor can add an indicator corresponding to the associated node in a just arrived list 128. The just arrived list 128 can provide a list of nodes whose current report value is alert. For example, when a value of alert is received from the first node 111, the processor 114 can add an indicator corresponding to the first node 111 in the just arrived list 128.

The calculation module 126 may be executable by the processor 114 to calculate a corresponding current report weight of each of the network nodes 110 based on the current report value of the corresponding network node. In a particular illustrative embodiment, the current report weight of the first node 111 is based on the current report value of the first node 111 and based on a previous report weight associated with the first node 111. In a particular illustrative embodiment, the current report weight of the first node 111 is indicative of a reliability history of the first node 111.

The output module 124 may be executable by the processor 114 to cause the processor 114 to store a current report weight that has been calculated. For example, the output module 124 may store the current report weight associated with a particular network node at a report weight storage 122. Additionally, the output module 124 may maintain one or more lists based on the calculated report weights and the current report values received from the network nodes 110. The one or more lists may include an active alert list 130. The active alert list 130 can store an indication of each of the monitored network nodes 110 where the current report weight satisfies an active alert threshold. The lists may also include a fading alert list 132. The fading alert list 132 can store an indication of each network node where the current report weight does not satisfy the active alert threshold and does satisfy a fading list threshold. A threshold storage 138 can store threshold values including the active alert threshold and the fading alert threshold.

The prediction module 134 may be executable by the processor 114 to cause the processor 114 to determine a predicted next report value of one or more of the network nodes 110. In a particular illustrative embodiment, the predicted next report value is calculated based on the current report weight. The processor 114 may store a predicted next report value associated with one of the network nodes 110 in a predicted report value storage 140.

The severity module 124 includes instructions that may be executable by the processor 114 to cause the processor 114 to determine a severity category associated with the current report weight of a network node, such as the first node 111. A severity category is a label assigned to a range of report weight values. The severity category associated with a particular node, such as the first node 111, can indicate a degree of unreliability of the first node 111.

In operation, multiple report values associated with each of the network nodes 110 may be received at the processing subsystem 104. For a particular network node, each report value may be received at a corresponding time within a predetermined time period. Each report value can be either alert or normal. For ease of description, a report value that was received at a previous time is referred to as a "previous report value" and a report value just received or received at a current time is referred to as a "current report value," as discussed further with reference to FIG. 4. Report values may be stored in the memory 116 at the report value storage 120. For example, a current report value of the first node 111 may be stored in the report value storage 120. In a particular illustrative embodiment, each time a current report value of the particular node is alert, the processor 114 verifies that the particular node is identified in a just arrived list 128. When the particular node has not previously been identified in the just arrived list 128, the processor 114 identifies the particular node in the just arrived list 128. For example, the first node 111 may be associated with a corresponding current report value stored at the report value storage 120. When the corresponding report value is alert, the first node 111 may be identified in the just arrived list 128.

The calculation module 126 may calculate the corresponding current report weight associated with each of the corresponding network nodes 110 based on a corresponding current report value. For example, a current report weight associated with the first node 111 may be calculated based on the current report value received from the first node 111. The current report weight of a particular node may also be based on a previous report weight associated with the particular node. For example, the current report weight may be based upon a previous report weight associated with the first node 111. In a particular illustrative embodiment, when a current report value is normal, the calculated current report weight is one-half the previous report weight. For example, when a previous report weight of the first node 111 is ten and the current report value is normal, then the calculated current report weight of the first node 111 is five.

In a particular illustrative embodiment, when the current report value is alert, the calculated current report weight is greater than the previous report weight. For example, when the previous report weight of the first node 111 is twelve and the current report value is alert, then the calculated current report weight of the first node 111 is fourteen. In a particular illustrative embodiment, the more report values of alert received from the first node 111 during the predetermined time period in which report values are received, the higher the calculated value of the current report weight, and the more report values of normal received during the predetermined time period, the lower the calculated value of the current report weight.

After the current report weight is calculated, it may be stored in the report weight storage 122 by the processor 114. In another particular embodiment, the current report weight associated with one of the network nodes 110 may be stored at another memory storage device (not shown).

When the current report weight associated with a particular node of the network nodes 110 satisfies a predetermined threshold, the node may be identified in the active alert list 130. For example, when the current report weight associated with the first node 111 satisfies the active alert threshold, the first node 111 may be added to the active alert list 130. The active alert threshold may be a predetermined value that is stored at the threshold storage 138. In a particular embodiment, when the current report weight associated with the particular node has been calculated, the processor 114 also determines whether the current report weight is greater than or equal to the active alert threshold. When the current report weight satisfies the active alert threshold, the particular node is identified in the active alert list.

When the current report weight associated with the particular node does not satisfy the active alert threshold, the processor 114 identifies the particular network node in the fading alert list 132 unless the current report weight fails to satisfy the fading alert threshold. The fading alert threshold may be a predetermined value stored at the threshold storage 138. When the fading alert threshold is not satisfied, the particular node may be removed from the fading alert list 132. For example, when the current report weight associated with the first node 111 satisfies the fading alert threshold and does not satisfy the active alert threshold, the first node 111 is identified in the fading alert list 132.

The current report weight and current report value may be used to predict a next report value to be received by the processing subsystem 104 and associated with a particular network node. In a particular illustrative embodiment, the predicted next report value can be alert or normal. In a particular illustrative embodiment, the predicted next report value is stored at a predicted report value storage 140, displayed at the display device 106, or both. In a particular illustrative embodiment, the predicted next report value is calculated based on the current report weight. For example, a high value of the current report weight indicates that many of the report values recently received that are associated with a particular node are alert, and therefore the next report value associated with the particular node is likely to be alert. Conversely, a low value of the current report weight indicates that many of the report values recently received that are associated with a particular node are normal, and therefore the next report value associated with the particular node is likely to be normal. Thus, the current report weight can serve as a predictive tool that can be used to predict the next report value and can be used to identify a potentially problematic network node.

In a particular illustrative example, the predicted next report value has a calculated confidence level. For instance, the predicted next value may be determined to be alert with a confidence level of 75% based on the current report weight.

The current report weight associated with a particular node may be used to determine a severity category associated with the node. Each severity category can be associated with current report weights whose values are within a corresponding range of current report weight values. Each severity category can be assigned a corresponding label. For example, each severity category may be labeled one of critical, major, minor, and clear. In a particular illustrative example, the severity category of a particular network node can be reflective of a history of alert values associated with the particular node. A severity category of major or critical can be indicative of unreliability of the particular node during a particular time period. The severity category may be interpreted as an indicator of an expected reliability of a node to communicate data in the future. In a particular embodiment, the severity category of a particular network node may be stored in memory.

The processing subsystem 104 is adapted to output data to the display device 106. For example, the processing subsystem 104 can output a representation of the active alert list 130 to be displayed at the display device 106. In another example, the processing subsystem 104 can output a representation of the fading alert list 132. In another particular illustrative example, the processing subsystem 104 can output a severity category associated with a particular node to the display device 106. In a particular illustrative example, the output can aid an operator in allocating resources or in identifying problems.

Figure 2:
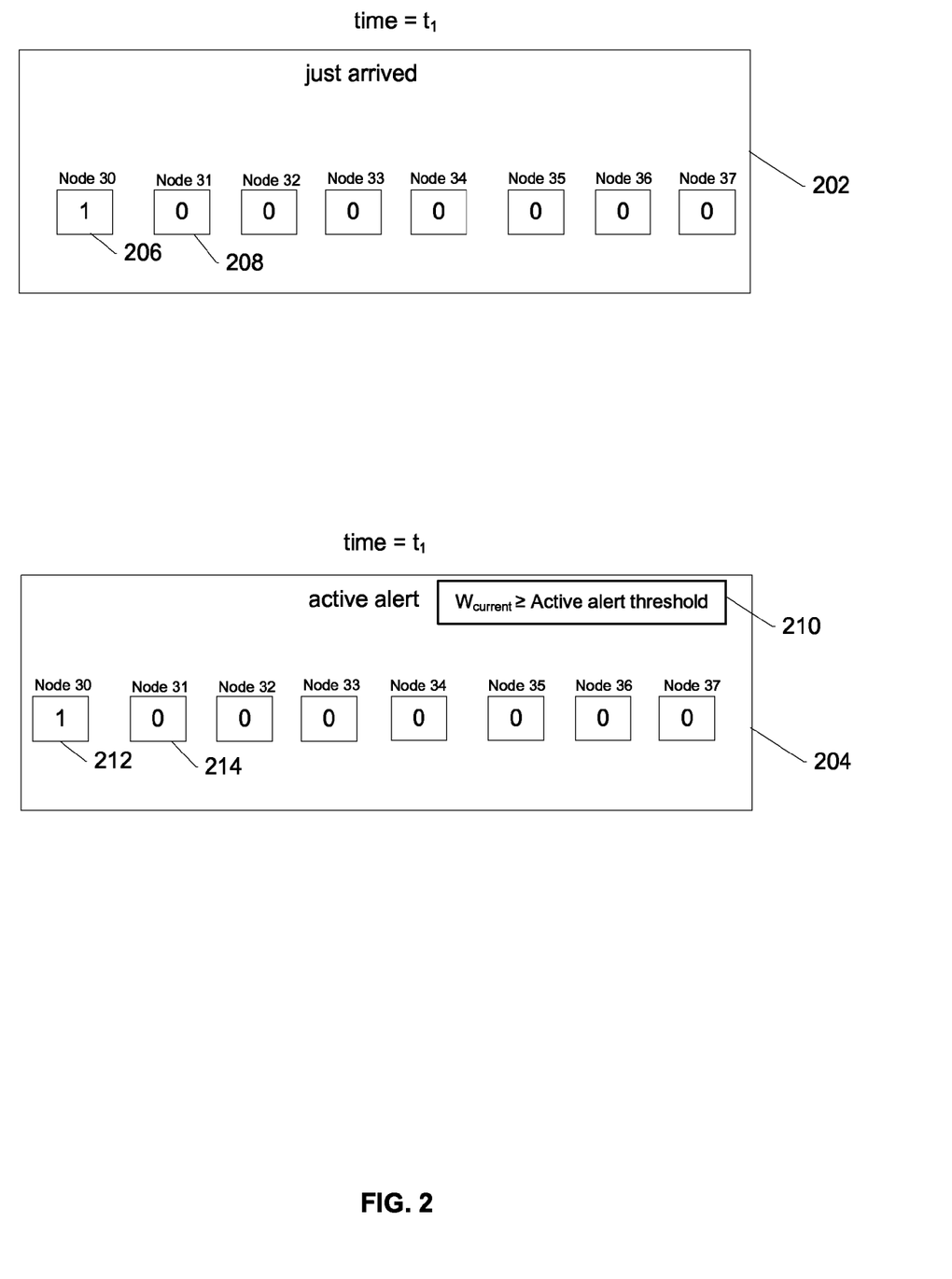
FIG. 2 is a diagram of a first embodiment of a representation of data reflecting network node health status.

FIG. 2 is a diagram of a first embodiment of a representation of data reflecting network node health status. FIG. 2 includes a just arrived list 202 and an active alert list 204. Each of the monitored network nodes 110 of FIG. 1 may have a corresponding memory location (e.g., a bit) in the just arrived list 202, and each of the monitored nodes 110 may have a corresponding memory location in the active alert list 204. The just arrived list 202 may include data indicating whether a current report value of alert has been received from a corresponding network node. For example, a first memory location 206 is associated with a node identified as "Node 30." The first memory location 206 includes data indicating that a current report value of alert associated with Node 30 has been received. In a particular embodiment, Node 30 may correspond to one of the network nodes 110 disclosed with reference to FIG. 1, such as the first node 111. In this embodiment, after the current report value of alert is received for Node 30, the memory location 206 is set to one, e.g., by the processing subsystem 104 of FIG. 1.

In a particular illustrative embodiment, when the current report value associated with a particular network node is normal, the corresponding bit of the just arrived list 202 is set to zero. For example, a second memory location 208 is associated with a node identified as "Node 31," the current alert value associated with the Node 31 is normal, and thus the memory location 208 is set to zero.

In a particular illustrative example, an active alert threshold is a predetermined number that is used to determine which network nodes are identified to be "active alert." For example, a condition 210 associated with the active alert list 204 specifies that when a current report weight associated with a particular network node satisfies (i.e., is greater than or equal to) the active alert threshold, a memory location corresponding to the particular network node within the active alert list 204 is set to one. When the calculated current report weight associated with the particular network node does not satisfy (i.e., is less than) the active alert threshold, the memory location within the active alert list is set to zero.

For example, the current report weight associated with the Node 30 satisfies the active alert threshold, based on the condition 210. Therefore, a memory location 212 corresponding to the Node 30 is set to one. In another example, a calculated current report weight associated with the Node 31 does not satisfy the active alert threshold, based on the condition 210. Therefore, a memory location 214 corresponding to the Node 31 is set to zero. As depicted in FIG. 2, the active alert list 204 indicates that Node 30 has one or more report values of alert during the predetermined time in which the report values are received. In a particular illustrative embodiment, the active alert list 204 includes data that can be interpreted as reflective of which network nodes are potentially problematic.

Figure 3:
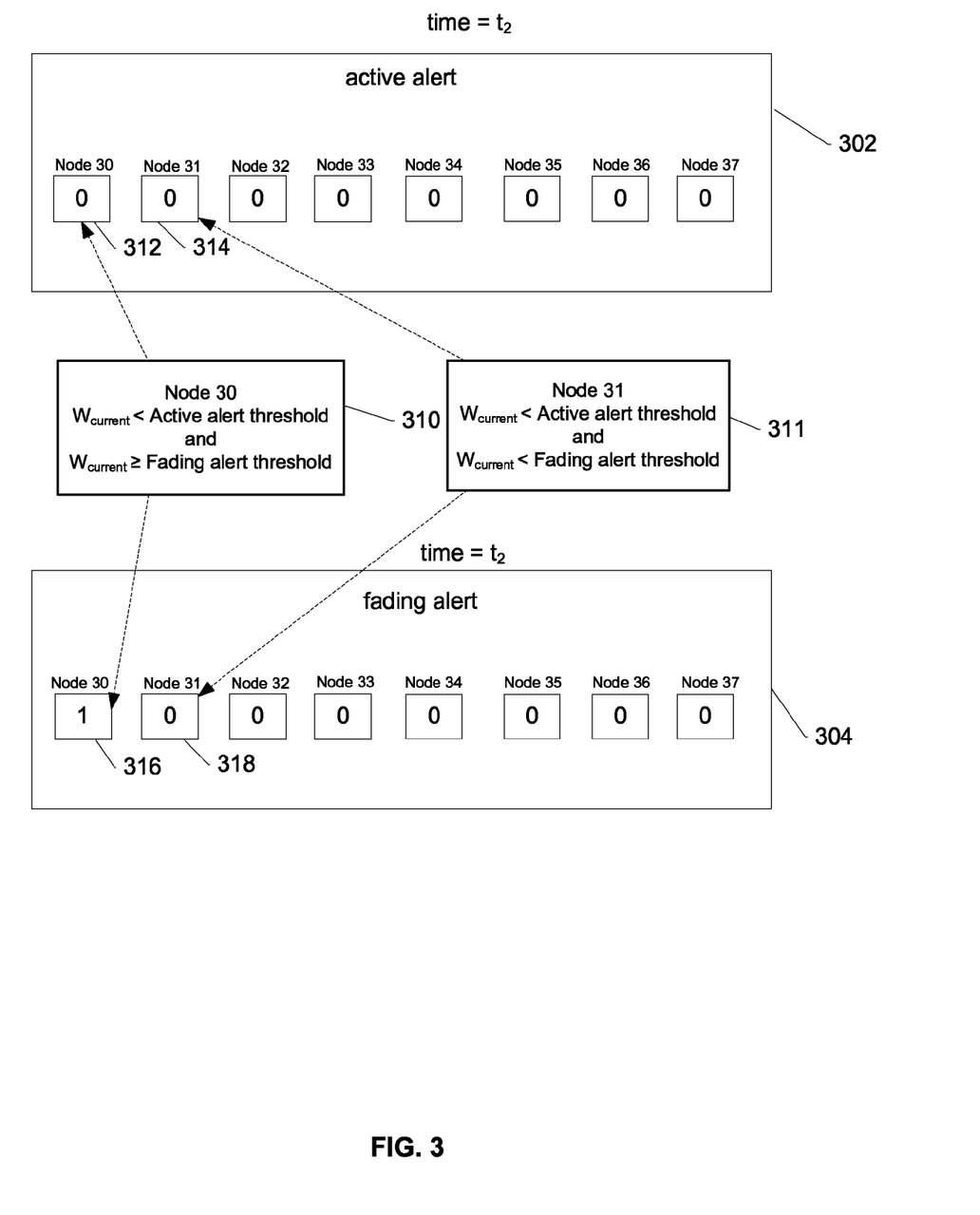
FIG. 3 is a diagram of a second embodiment of a representation of data reflecting network node health status.

FIG. 3 is a diagram of a second embodiment of a representation of data reflecting network node health status. FIG. 3 includes an active alert list 302 and a fading alert list 304. Each network node that is monitored may be associated with a corresponding memory location of the active alert list 302 and a corresponding memory location of the fading alert list 304. For example, each of the network nodes 110 of FIG. 1 can have a corresponding memory location (e.g., a bit) in the active alert list 302, and each of the network nodes 110 can have a corresponding memory location in the fading alert list 304.

In a particular illustrative embodiment, the active alert list 302 can be interpreted as including data reflective of which network nodes are potentially problematic and the data can be based upon a report history of each corresponding network node. In a particular illustrative example, an active alert threshold is a predetermined number that is used to determine which network nodes are identified to be "active alert." For example, a condition 310 may be associated with the active alert list 302. The condition 310 specifies that when a current report weight associated with a particular network node satisfies the active alert threshold, a memory location corresponding to the particular network node within the active alert list 302 is set to one. When the calculated current report weight associated with the particular network node does not satisfy the active alert threshold, the memory location within the active alert list is set to zero.

For example, the current report weight associated with the Node 30 satisfies the active alert threshold, based on the condition 310. Therefore, a memory location 312 corresponding to the Node 30 is set to one. In another example, a calculated current report weight associated with the Node 31 does not satisfy the active alert threshold based on a condition 311. Therefore, a memory location 314 corresponding to the Node 31 is set to zero. As depicted in FIG. 3, the active alert list 302 indicates that Node 30 has one or more associated report values of alert received, by e.g., the processing subsystem 104, during the predetermined time in which the report values are received. A representation of the active alert list 302 may be displayed at a display device, such as the display device 106 of FIG. 1.

The fading alert list 304 may be interpreted as including data reflective of network nodes that have had a history of problematic behavior, but whose most recent history indicates a trend toward node reliability. In a particular illustrative example, a fading alert threshold is a predetermined number that is used to determine which network nodes are identified to be "fading alert." For example, the condition 310 specifies that when the current report weight associated with a particular network node does not satisfy the active alert threshold and satisfies the fading alert threshold, a memory location corresponding to the particular network node within the fading alert list 304 is set to one. A representation of the fading alert list 304 may be displayed at a display device, such as the display device 106 of FIG. 1.

In a particular illustrative example, the current report weight associated with Node 30 does not satisfy the active alert threshold and satisfies the fading alert threshold, based on the condition 310. Thus, a memory location 316 corresponding to Node 30 is set to one.

The condition 311 specifies that when the current report weight associated with a particular network node does not satisfy the active alert threshold and does not satisfy the fading alert threshold, a memory location corresponding to the particular network node within the fading alert list 304 is set to zero. In a particular illustrative example, the current report weight associated with Node 31 does not satisfy the active alert threshold and does not satisfy the fading alert threshold, based on the condition 311. Thus, a memory location 318 corresponding to Node 31 is set to zero.

In a particular illustrative embodiment, the more consecutive alert values associated with a particular network node that are received during the predetermined time period, the larger the current report weight associated with the particular network node. If the current report weight satisfies the active alert threshold, the bit associated with the particular network node in the active alert list is set to one. Conversely, the greater the consecutive number of current report values that are normal, the smaller the current report weight associated with the particular network node. If the current report weight does not satisfy the active alert threshold, the bit associated with the particular network node in the active alert list is set to zero.

In a particular illustrative example, the fading alert list 304 may be interpreted as identifying network nodes that have associated report values that include both normal and alert events received within a predetermined time period. For instance, in the particular illustrative example of FIG. 3, the combination of data in the active alert list and the fading alert list may be interpreted as Node 30 having had a history of one or more alerts, but not having a consecutive stream of alerts within the predetermined time period.

In a particular illustrative embodiment, each time a report value of normal is received, the corresponding current report weight is less than a previous report weight. In a particular illustrative embodiment, after a string of consecutive normal values associated with Node 31 is received, the current report weight is less than the fading alert threshold and the associated bit value 318 is set to zero. Thus, the more consecutive report values of normal associated with a particular network node that are received, the less is the calculated value of the current report weight. When the current report weight does not satisfy the Failing alert threshold, the corresponding bit value in the fading alert list is set to zero. Setting a bit value in the fading alert list 304 to zero is also referred to as removing the associated network node from the fading alert list 304.

A particular node having a corresponding memory location with a bit value of one in the active alert list can be interpreted as storing an indicator that the particular network node has had a history reflecting some degree of unreliability. A particular node having a corresponding memory location with a bit value of one in the fading alert list can be interpreted as indicating that the particular node had been troublesome but is showing signs of improved reliability. In a particular illustrative embodiment, a bit value of one in the fading alert list can be indicative that the associated node has had one or more alerts during the predetermined time period and one or more successive normal values during a recent portion of the predetermined time period. In a particular illustrative embodiment, a particular node having a corresponding memory location with a bit value of zero in the active alert list and a corresponding memory location with a bit value of zero in the fading alert list can be interpreted as an indicator that the particular node is reliable.

Figure 4:
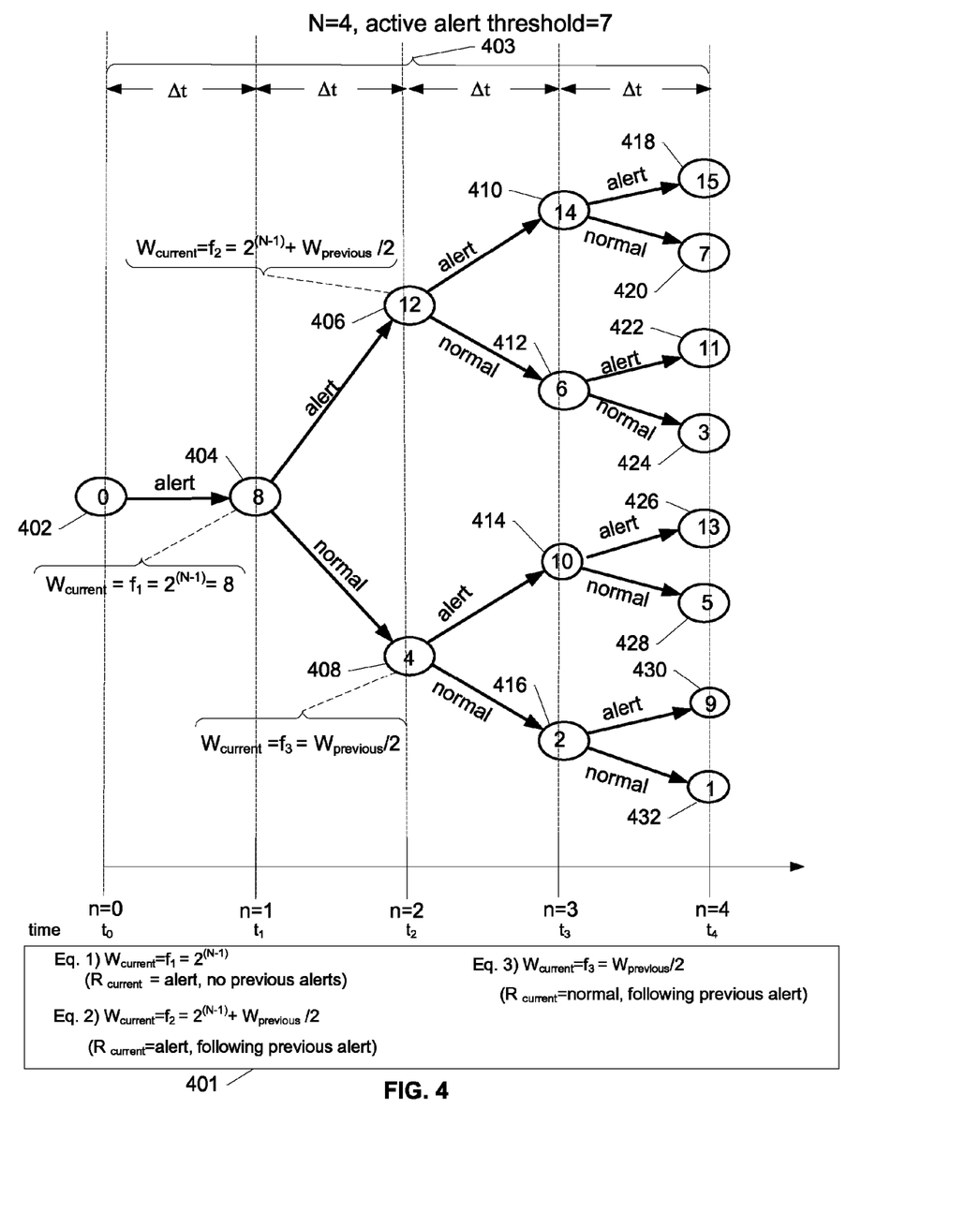
FIG. 4 is a diagram of a particular illustrative example of an embodiment illustrating a method to monitor network health status.

FIG. 4 is a diagram of a particular embodiment to illustrate a method to monitor network health status. The diagram is associated with a particular network node that issues a current report value periodically during a predetermined time period 403. Each report value is indexed by a corresponding integer value n. A total of four report values (N=4) are to be received at corresponding times $t_1$, $t_2$, $t_3$, $t_4$ during the predetermined time period 403 and are indexed n=1, 2, 3, 4. In a particular illustrative embodiment, a time interval between report values received has the same value of a time interval $\Delta t$ for each consecutive pair of report values. For example, $\Delta t = t_2 - t_1 = t_3 - t_2 = t_4 - t_3$. In a particular illustrative embodiment, a current report weight $W_{current}$ calculation depends upon the current report value and also depends on a previous report weight, as shown at 401. In a particular illustrative embodiment, the previous report weight can depend on a previous report value. The previous report value refers to the report value received prior to the current report value. Because more than one previous report value may have been received, the previous report values are referred to here in reverse sequence of receipt. For example, a first previous report value refers to the report value received immediately prior to the current report value. In similar fashion, second previous report value refers to the report value received immediately prior to the first previous report value.

For a particular node, when the current report value is alert and there are no previous alerts, the current report weight is calculated based on the total number of report values to be received during the predetermined time period 403. For example, at 404, the current report value is alert and there are no previous alerts that have been received during the predetermined time period 403, and $W_{current}$ is calculated using a function $f_1$ (Eq. 1, 401).

When the current report value is alert and a report value of alert had been received previously, the current report weight is calculated based on the previous report weight and also based upon the total number N of report values to be received during the predetermined time period 403. For example, when the current report value is alert and follows a previous alert received, shown at 406, the current report weight is calculated using $f_2$ (Eq. 2, 401).

When the current report value is normal, and an alert had been received previously, the current report weight is calculated using $f_3$ (Eq. 3, 401). For example, when the current report value is normal and follows a previous alert that has been received, shown at 408, the current report weight is calculated using $f_3$ (Eq. 3, 401). In a particular example, the current report weight has a calculated value that is less than the previous report weight.

When a current report value is normal, the current report weight may be less than the previous report weight. When the current report value is alert, the current report weight may be higher than the previous report weight.

The current report weight associated with a particular node, such as one of the network nodes 110 of FIG. 1, may be calculated based on the above considerations. In a particular illustrative embodiment, the current report weight is determined as shown in FIG. 4. At the left of FIG. 4, n=0 is a starting point at the beginning of the predetermined time period T. At n=0 an initial report weight 402 is zero. After a first time interval $\Delta t$, a first report value (n=1) received is alert. The corresponding current report weight is calculated to be $f_1 = 2^{N-1} = 8$, shown in 404.

At n=2, there are two possibilities. When the current report value received is alert, then at 406 the current report weight is calculated to be $f_2 = 12$. When, at n=2 the current report value received is normal, the current report weight is calculated to be $f_3 = 4$, shown at 408.

At n=3, the current report weight depends on the current report value, the first previous report value and the second previous report value. For example, the current report weight may depend on the current report value and the previous report weight, which depends on the first previous report value and the second previous report weight. To illustrate, when the current report value at n=3 is alert and the first previous report weight $W_{previous}$ 406 has a value of 12, then the current report weight $W_{current}$ 410 at n=3 has a calculated value of $f_2 = 14$. When the current report value at n=3 is normal and the first previous report weight $W_{previous}$ 406 has a value of 12, then the current report weight $W_{current}$ 412 at n=3 has a calculated value of $f_3 = 6$.

When the current report value at n=3 is alert and the first previous report weight $W_{previous}$ 408 has a value of 4, then at 414 the current report weight $W_{current}$ at n=3 has a calculated value of $f_2 = 10$. When the third current report value at n=3 is normal and the first previous report weight $W_{previous}$ 408 has a value of 4, then the current report weight $W_{current}$ 416 has a calculated value of $f_3 = 2$.

At n=4, the current report weight depends on the current report value, the first previous report value and the second previous report value. For example, the current report weight may depend on the current report value and the previous report weight, which depends on the first previous report value and the second previous report weight. To illustrate, when the current report value at n=4 is alert and the previous report weight $W_{previous}$ 410 has a value of 14, then the current report weight $W_{current}$ 418 has a calculated value of $f_2 = 15$. When the current report value at n=4 is normal and the previous report weight $W_{previous}$ 410 has a value of 14, the current report weight $W_{current}$ 420 has a calculated value of $f_3 = 7$.

When the fourth current report value at n=4 is alert and the previous report weight $W_{previous}$ 412 has a value of 6, the current report weight $W_{current}$ 422 has a calculated value of $f_2 = 11$. When the current report value at n=4 is normal and the previous report weight $W_{previous}$ 412 has a value of 6, the current report weight $W_{current}$ 424 has a calculated value of $f_3 = 3$.

When the current report value at n=4 is alert and the previous report weight $W_{previous}$ 414 has a value of 10, the current report weight $W_{current}$ 426 has a calculated value of $f_2 = 13$. When the current report value at n=4 is normal and the previous report weight $W_{previous}$ 414 has a value of 10, the current report weight $W_{current}$ 428 has a calculated value of $f_3 = 5$.

When the current report value at n=4 is alert and the previous report weight $W_{previous}$ 416 has a value of 2, the current report weight $W_{current}$ 430 has a calculated value of $f_2 = 9$. When the current report value at n=4 is normal and the previous report weight $W_{previous}$ 416 has a value of 2, the current report weight $W_{current}$ 432 has a calculated value of $f_3 = 1$.

Thus, in the example shown in FIG. 4, when the current report value is alert, the current report weight is greater than the previous report weight. When the current report value is normal, the current report weight is less than the previous report weight.

In a particular embodiment, a current report weight may be calculated using integer division, i.e., performing a division operation producing a resultant quantity and truncating a non-integer portion of the resultant quantity to produce a truncated resultant. For example, when a resultant quantity has a value 0.5, the truncated resultant is zero.

In the particular example shown in FIG. 4, an active alert threshold has been set to a value of 7. When a current report weight $W_{current}$ does not satisfy the active alert threshold, i.e., $W_{current}$ is less than 7, a corresponding bit value in an active alert list such as the active alert list of FIGS. 2 and 3, may be set to zero. When the current report weight $W_{current}$ satisfies the active alert threshold, i.e., $W_{current}$ is greater than or equal to 7, the corresponding bit in the active alert list may be set to 1.

In a particular illustrative embodiment, the active alert threshold is set to a value of 7 and a fading alert threshold is set to a value of 1. When a current report weight $W_{current}$ has a calculated value that is less than 7 and greater than 1, a corresponding bit value in the active alert list shown in FIG. 3 may be set to zero and a corresponding bit value in a fading alert list, as shown in FIG. 3, may be set to 1. When the current report weight $W_{current}$ less than 1, the corresponding bit in the fading alert list may be set to 0.

Figure 5:
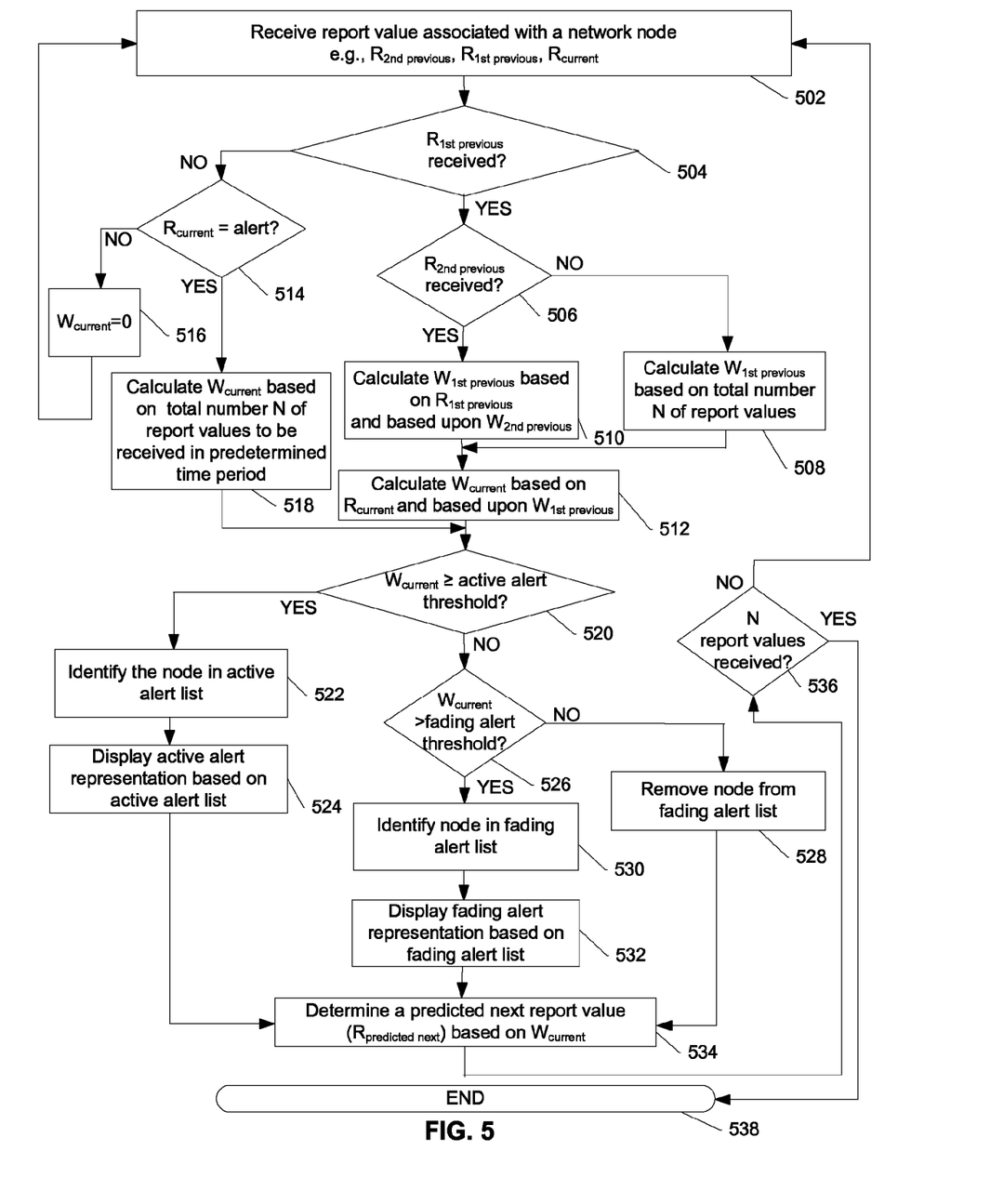
FIG. 5 is a flow chart of a first particular embodiment of a method of monitoring network health status.

FIG. 5 is a flow chart of a first particular embodiment of a method of monitoring network health status. At 502, a report value associated with a network node is received. In a particular example, a first report value $R_{2nd\ previous}$ may be received at a time $t_1$. A second report value $R_{1st\ previous}$ may be received at a time $t_2$ that is subsequent to $t_1$. A third report value current may be received at a time $t_3$ that is subsequent to $t_2$. Each report value may have a value of alert or normal. In another particular example, the first received report value may be $R_{current}$ received at a first time $t_1$ and no previous report values may have been received. In another particular example, the first received report value $R_{1st\ previous}$ may be received at a time $t_1$ and the current report value $R_{current}$ may be received at a time $t_2$ that is subsequent to $t_1$. A total number of report values, N, are to be received in a predetermined time period T.

At 504, when there is no previous first report value $R_{1st\ previous}$, the current report value current is the first report value (n=1) to be received during the predetermined time period T. That is, referring to FIG. 4, the current report value current may have an index n=1, as indicated at 404. Returning to FIG. 5, when the current report value $R_{current}$ is not alert at 514 (e.g., when current is normal), the current report weight $W_{current}$ is calculated to be zero, at 516. The method then proceeds back to 502 to receive the next report value. When the current report value current is alert at 514, the current report weight $W_{current}$ is calculated based on a total number of report values N received during the predetermined time period T, at 518. The method proceeds to 520.

Returning to 504, when a first previous report value $R_{1st\ previous}$ has been received, the method proceeds to 506. When, at 506, a second previous report value $R_{2nd\ previous}$ has been received, the method proceeds to 510 and a first previous report weight $W_{1st\ previous}$ is calculated based on the first previous report value $R_{1st\ previous}$ and also based on a second previous report weight $W_{2nd\ previous}$. When the first previous report value $R_{1st\ previous}$ is the first report value to be received during the predetermined time period T (i.e., there is no $R_{2nd\ previous}$) at 506, the method proceeds to 508 and the first previous report weight Wist previous is calculated based on the total number of report values N to be received in the predetermined time period T. The method proceeds to 512, where the current report weight $W_{current}$ is calculated based on the current report value $R_{current}$ and also based on the first previous report weight $W_{1st\ previous}$ that was calculated at 508 or at 510.

Advancing to 520, when the current report weight $W_{current}$ satisfies an active alert threshold, the method proceeds to 522, where the network node is identified in an active alert list. For example, the network node is identified by setting a corresponding bit in the active alert list to one. The method proceeds to 524, and an active alert representation based on the active alert list is optionally displayed. In a particular illustrative embodiment, each network node being monitored has a corresponding bit in the active alert list. Each network node that has a current report weight $W_{current}$ satisfying the active alert threshold is identified in the active alert list. In this manner, the active alert list records those network nodes that have generated alert report values and for which the corresponding current report weight satisfies the active alert threshold.

Returning to 520, when the current report weight $W_{current}$ does not satisfy the active alert threshold, the method proceeds to 526. At 526, when the current report weight $W_{current}$ does not satisfy a fading alert threshold, the network node is removed from the fading alert list, at 528. In a particular illustrative embodiment, removing the network node from the fading alert list is accomplished by setting a corresponding bit in the fading alert list to zero. Returning to 526, when the current report weight $W_{current}$ satisfies the fading alert threshold, the method proceeds to 530 where the network node is identified a fading alert list. In a particular illustrative embodiment, identifying the network node in the fading alert list includes setting a bit corresponding to the network node to one. Advancing to 532, a fading alert representation based on the fading alert list is displayed. Proceeding to 534, a predicted next report value $R_{predicted}$ next is optionally determined. The predicted next report value $R_{predicted}$ next may be interpreted to be a predicted value of a report value to be received during the predetermined time period T. In a particular illustrative embodiment, the value of the predicted next report value $R_{predicted}$ next is calculated based on the current report weight $W_{current}$.

Proceeding to 536, when N report values have been received during the predetermined time period T, the method terminates at 538. When fewer than N report values have been received during the predetermined time period T, the method returns to 502 and another report value is received.

Figure 6:
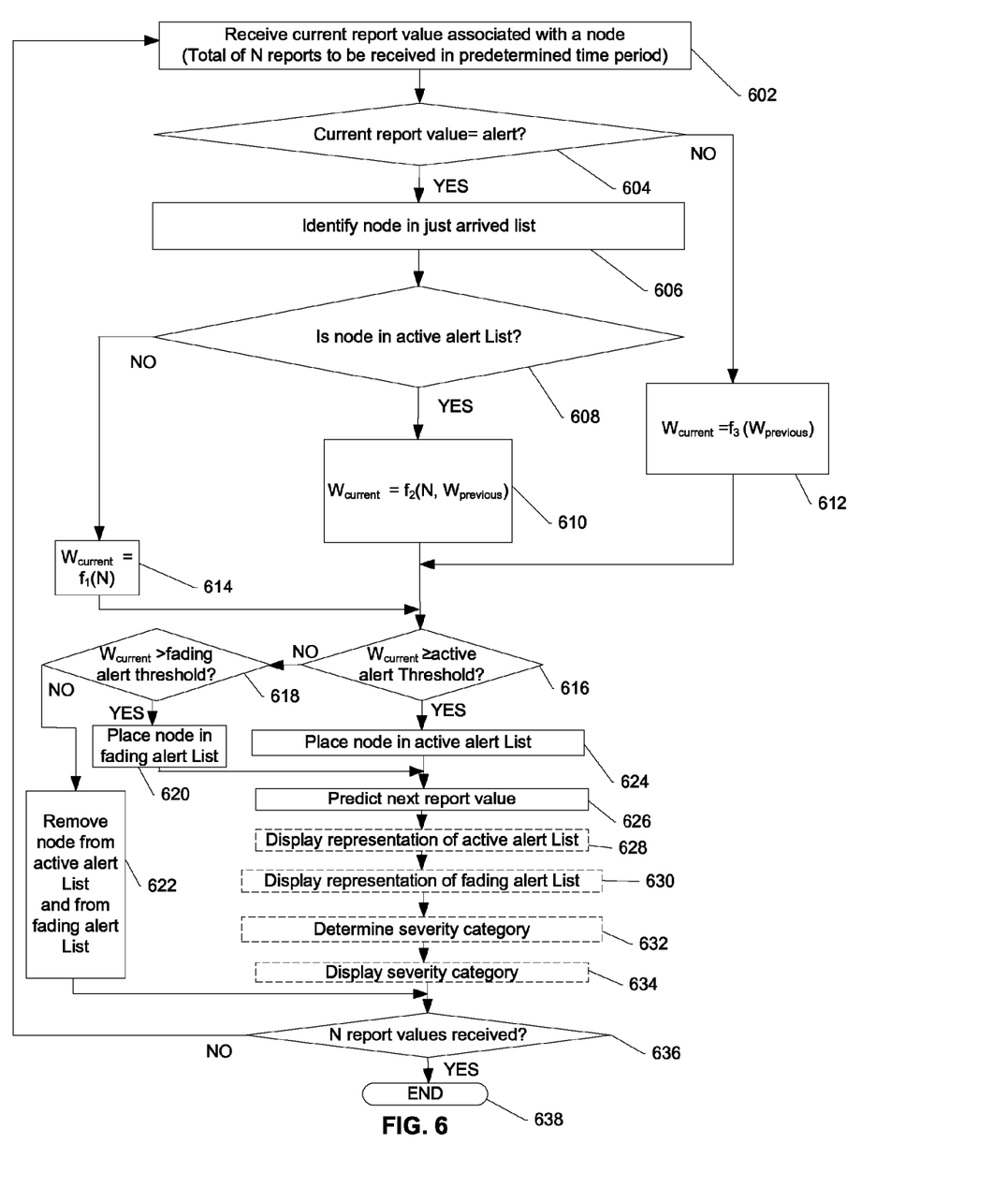
FIG. 6 is a flow chart of a second particular embodiment of a method of monitoring network health status.

FIG. 6 is a flow chart of a second particular embodiment of a method of monitoring network health status. A current report value associated with a network node may be received, at 602. A total number of report values, N, are to be received during a predetermined time period T. Proceeding to 604, when the current report value is alert, the network node associated with the current report value may be identified in a just arrived list. For example, the network node may be identified by setting a corresponding bit in the just arrived list to one.

Proceeding to 608, when the network node is in an active alert list, the method proceeds to 610 where a current report weight may be calculated. In a particular illustrative example, because the current report value of the network node is alert, the network node has been identified in the active alert list. For example, the current report weight may be calculated based on a previous report weight and the total number of reports N to be received in the predetermined time period T. When the node is not in the active alert list, the method proceeds to 614, where the current report weight may be calculated. For example, the current report weight may be calculated based on the total number of reports N received in the predetermined time period T.

Returning to 604, when the current report value is not alert, (e.g., the current report value is normal), the method proceeds to 612 and the current report weight $W_{current}$ may be calculated. For example, the current report weight $W_{current}$ may be calculated based on the previous report weight $W_{previous}$. In a particular illustrative example, when the previous report weight $W_{previous}$ is zero, then the current report weight $W_{current}$ has a calculated value of zero. In another illustrative example, when the current report value is normal and the previous report weight $W_{previous}$ is greater than zero, then the current report weight $W_{current}$ has a calculated value that is less than the previous report weight $W_{previous}$.

Proceeding to 616, when the current report weight $W_{current}$ satisfies an active alert threshold, the node may be identified in the active alert list, at 624. When the current report weight $W_{current}$ does not satisfy the active alert threshold, the method proceeds to 618. At 618, when the current report weight $W_{current}$ satisfies a fading alert threshold, the node may be identified in the fading alert list, at 620. When the current report weight $W_{current}$ does not satisfy the fading alert threshold, the node is removed from the active alert list and from the fading alert list, at 622. For example, the node can be removed from the active alert list by setting the corresponding bit in the active alert list to zero. The node can be removed from the fading alert list by setting a corresponding bit in the fading alert list to zero.

After the node is identified in the fading alert list at 620 or when the node has been placed in the active alert list at 624, the method proceeds to 626. At 626, a next report value is predicted. In a particular illustrative example, the next report value is predicted based on the current report weight. For example, if the current report weight $W_{current}$ has a high value, the next report value can be predicted to be the same value as the current report value. Advancing to 628, a representation of the active alert list is optionally displayed. Proceeding to 630, a representation of the fading alert list is optionally displayed. Proceeding to 632, a severity category is optionally determined. For example, the severity category may be determined based on predetermined ranges of values of the current report weight $W_{current}$. In a particular illustrative embodiment, a higher current report weight is associated with a higher severity category. In a particular illustrative embodiment, the severity categories may be labeled with labels that include critical, major, minor, and clear. In a particular illustrative embodiment, by categorizing each current report weight in a severity category, those network nodes having a higher severity category (e.g., critical or major) can be recognized as potentially problematic nodes. Proceeding to 634, the method optionally displays the severity category associated with the network node.

At 636, when the total number of report values N has been received during the predetermined time period T, the method terminates at 638. When additional report values are to be received, the method returns to 602 to receive another current report value.

In a particular embodiment, another total number of report values N' can be specified to be collected during another predetermined time period T' subsequent to the predetermined time period T. The methods of FIGS. 5 and 6 can be applied to report values to be received during the predetermined time period T'.

Figure 7:
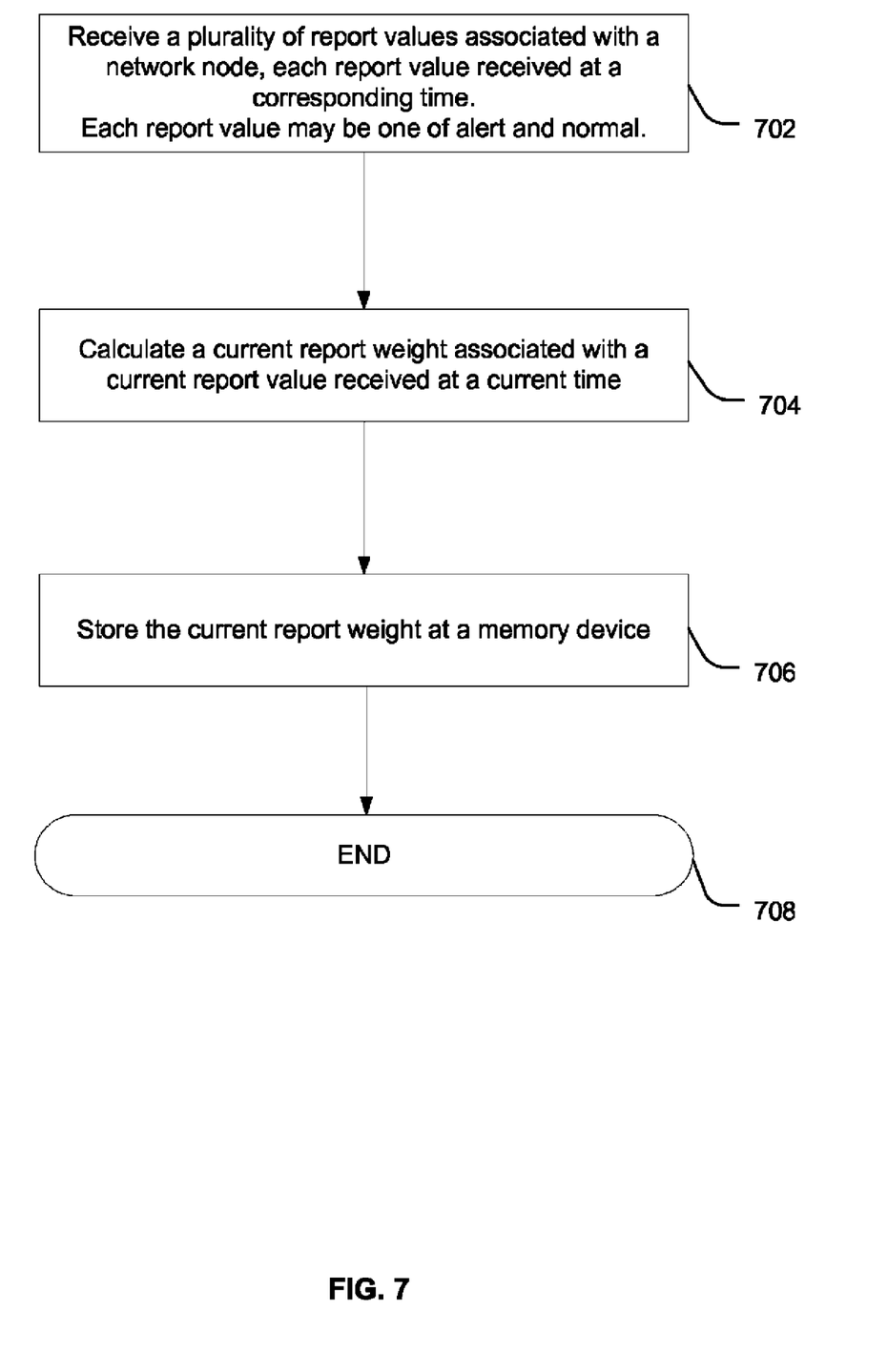
FIG. 7 is a flow chart of a third particular embodiment of a method of monitoring network health status.

Referring to FIG. 7, a flow chart of a third particular embodiment of a method of monitoring network health status is shown. A plurality of report values associated with a network node is received, at 702. Each report value may be received at a corresponding time. Each report value may be alert or normal.

A current report weight associated with a current report value received at a current time is calculated, at 704. In a particular illustrative embodiment, when a first previous report value was received at a first previous time before the current time, the current report weight is calculated based at least partially on the current report value and at least partially on a first previous report weight associated with the first previous value. The current report weight is stored at a memory device, at 706, and the method ends at 708.

In operation, the methods and apparatus presented herein can provide monitoring capability of one or more network nodes of a network. Each monitored network node can issue a predetermined number of report values within a predetermined time period T. Each report value can be alert or normal. A current report weight may be calculated, based on a current report value and upon a previous report weight, and the current report weight may serve as an indicator of a functional history of the network node. A current report weight having a high value can indicate a network node history that may include one or more alerts, corresponding to node failures. A current report weight having a low value may indicate a network node history including fewer alerts. An active alert list can include an indication of each monitored network node having a recent history that includes one or more alerts. A fading alert list can include an indication of each monitored network node whose recent history includes few to no alerts. Each network node may be assigned a severity category based on the corresponding current report weight. A current report weight may be used to predict a next report value associated with the network node.

Figure 8:
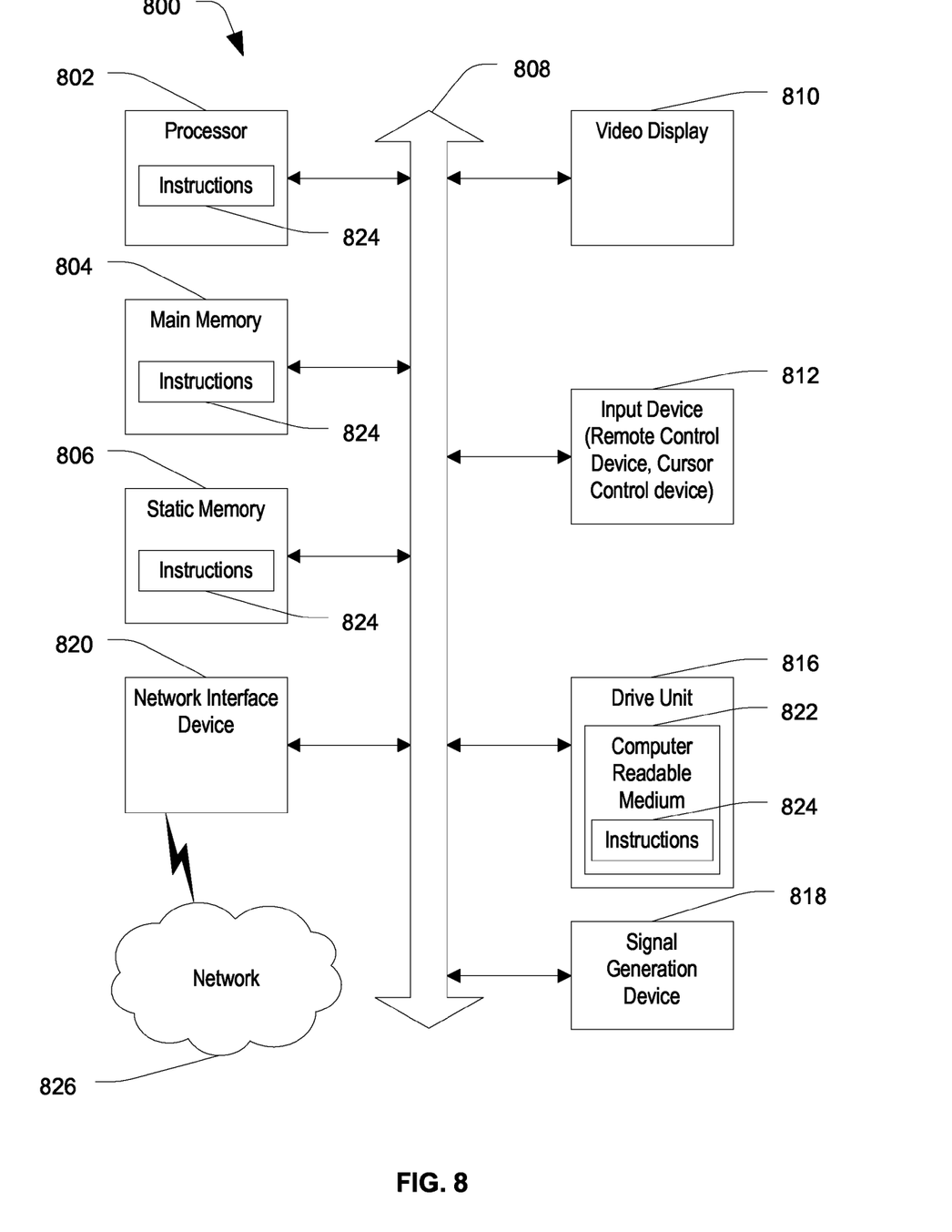
FIG. 8 is an illustrative embodiment of a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800 may be connected, e.g., using a network, to other computer systems or peripheral devices. For example, the computer system 800 may include or be included with any one or more of the processing subsystem 104 or the network 102 referred to in FIG. 1.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a desktop computer, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), an organic light emitting diode (OLED), a flat panel display, a solid state display, or a projection display. Additionally, the computer system 800 may include an input device 812, such as a keyboard, a cursor control device (such as a mouse), a remote control device, and so forth. The computer system 800 can also include a disk drive unit 816, a signal generation device 818, such as a speaker and a network interface device 820.

In a particular embodiment, as depicted in FIG. 8, the disk drive unit 816 may include a computer-readable storage medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A non-transitory computer-readable storage medium comprising processor-executable instructions that when executed, cause a processor to: calculate a plurality of report weights, wherein each report weight is associated with a corresponding network node of a plurality of network nodes, wherein the report weight is based at least partially on a status associated with the corresponding network node at a first time and at least partially on a previous status associated with the corresponding network node at a previous time, wherein the status is one of alert or normal, wherein the report weight is half of a previous report weight when the status is normal and wherein the report weight is a constant value plus half of the previous report weight when the status is alert, and wherein the previous report weight is based at least partially on the previous status; and store the plurality of report weights in a memory.

2. The non-transitory computer-readable storage medium of claim 1, wherein the previous status is one of alert and normal.

3. The non-transitory computer-readable storage medium of claim 1, further comprising processor-executable instructions that when executed, cause the processor to calculate a predicted next status associated with the corresponding network node that is one of normal and alert, wherein the predicted next status is based at least partially on the report weight.

4. A system comprising: a processor to receive a plurality of statuses associated with a corresponding network node of a plurality of network nodes, each status to be received at a corresponding time within a predetermined time period, the statuses including a status received at a first time and a previous status received at a previous time, wherein each status comprises one of alert and normal; and a memory device accessible to the processor, the memory device including: a calculation module executable by the processor to calculate a report weight associated with the corresponding network node, the report weight based at least partially on the status and based at least partially on the previous status, wherein the report weight is half of a previous report weight when the status is normal and wherein the report weight is a constant value plus half of the previous report weight when the status is alert, and wherein the previous report weight is based at least partially on the previous status; and an output module executable by the processor to store the plurality of report weights.

5. The system of claim 4, further comprising a prediction module to determine a predicted next status associated with the corresponding network node that is one of normal and alert, wherein the predicted next status is based at least partially on the report weight.

6. The system of claim 4, further comprising a severity module executable by the processor to store a severity category associated with the corresponding network node, wherein the severity category is determined based on the report weight.

7. The system of claim 6, wherein the severity category comprises one of critical, major, minor, and clear.

8. The system of claim 6, further comprising displaying the severity category associated with the network node on a display device.

* * * * *